Oct. 12, 1971

L. L. KAYSER 3,611,472

SELF-CLEANING FLOOR

Filed Feb. 4, 1969

Lee L. Kayser
INVENTOR.

BY *Clarence A. O'Brien*
and *Harvey B. Jackson*
Attorneys

Oct. 12, 1971
L. L. KAYSER
3,611,472
SELF-CLEANING FLOOR
Filed Feb. 4, 1969
4 Sheets-Sheet 2
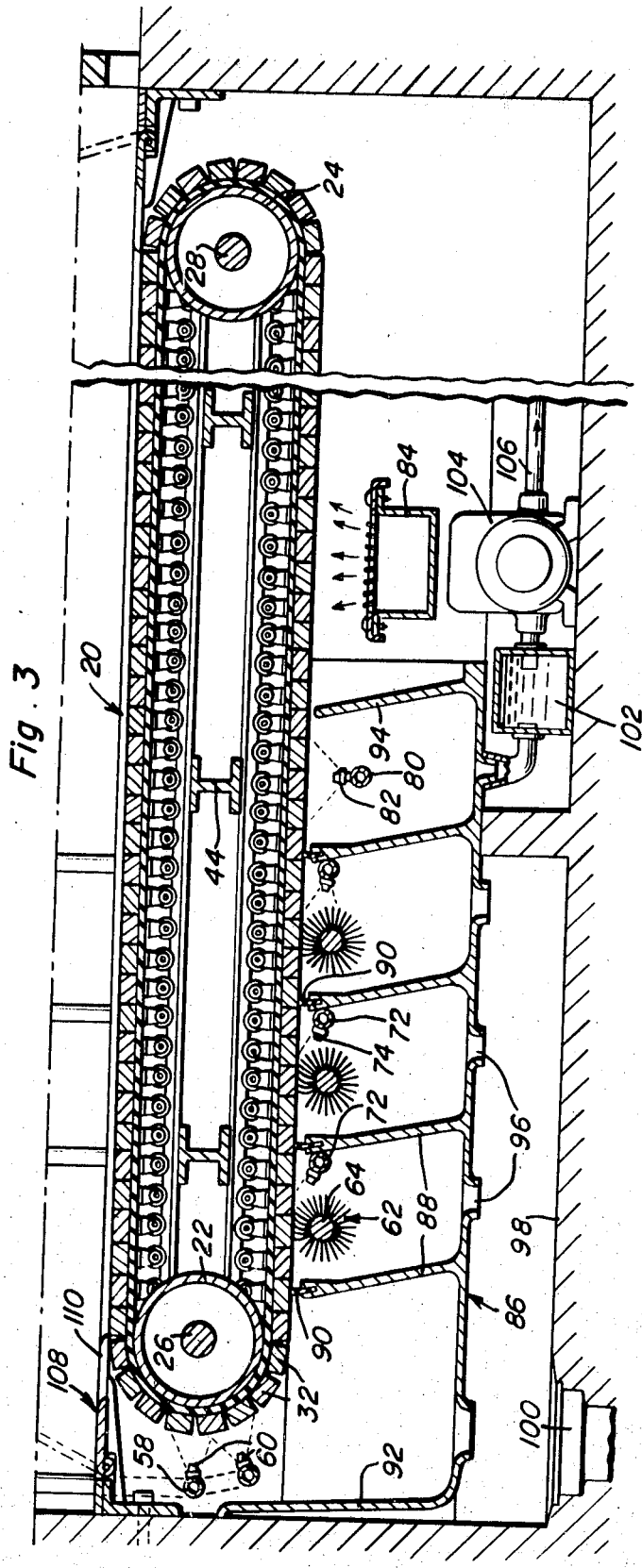
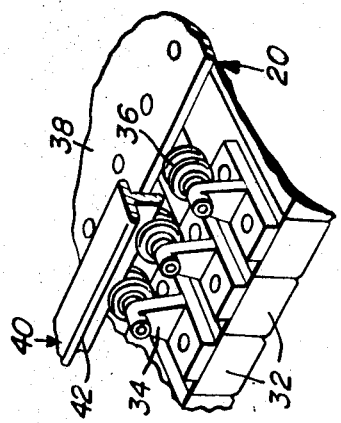
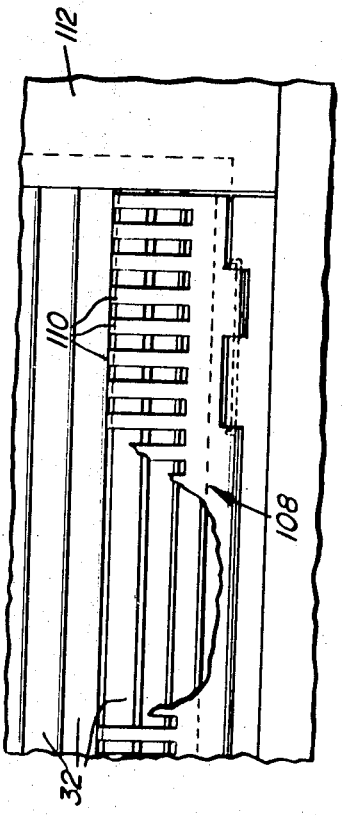
Lee L. Kayser
INVENTOR
BY *Clarence A. O'Brien*
and *Harvey B. Jacobson*
Attorneys Oct. 12, 1971 L. L. KAYSER 3,611,472
SELF-CLEANING FLOOR
Filed Feb. 4, 1969 4 Sheets-Sheet 3
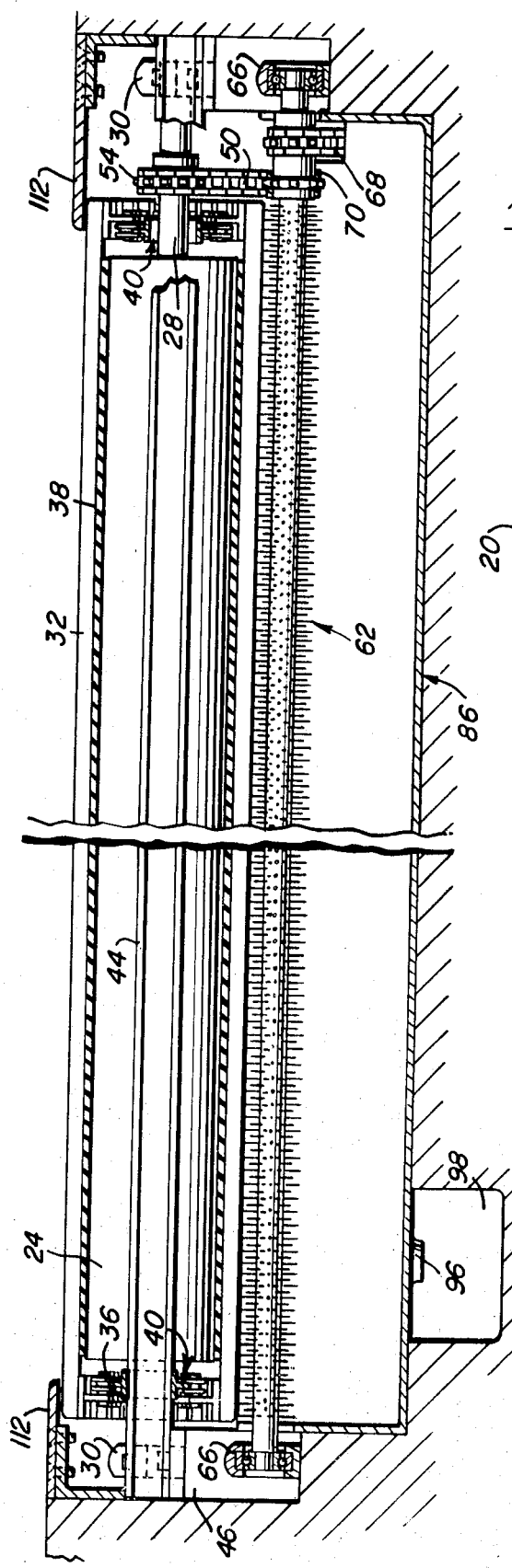
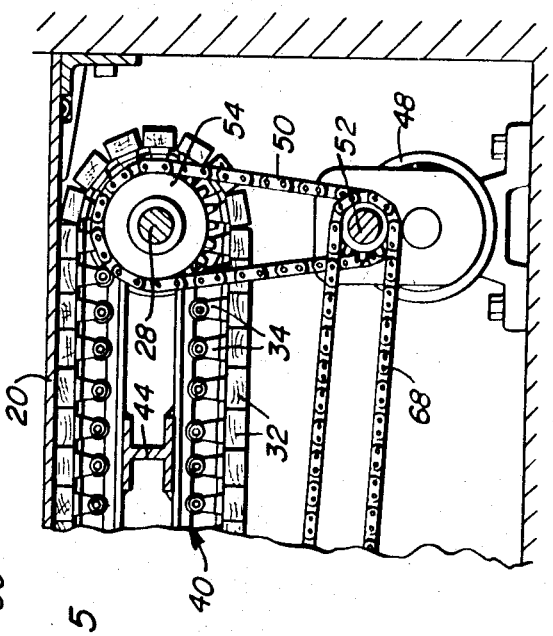
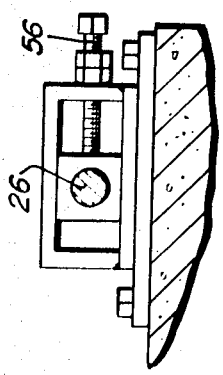
Lee L. Kayser
INVENTOR Oct. 12, 1971                L. L. KAYSER                3,611,472
                          SELF-CLEANING FLOOR
Filed Feb. 4, 1969                                    4 Sheets-Sheet 4
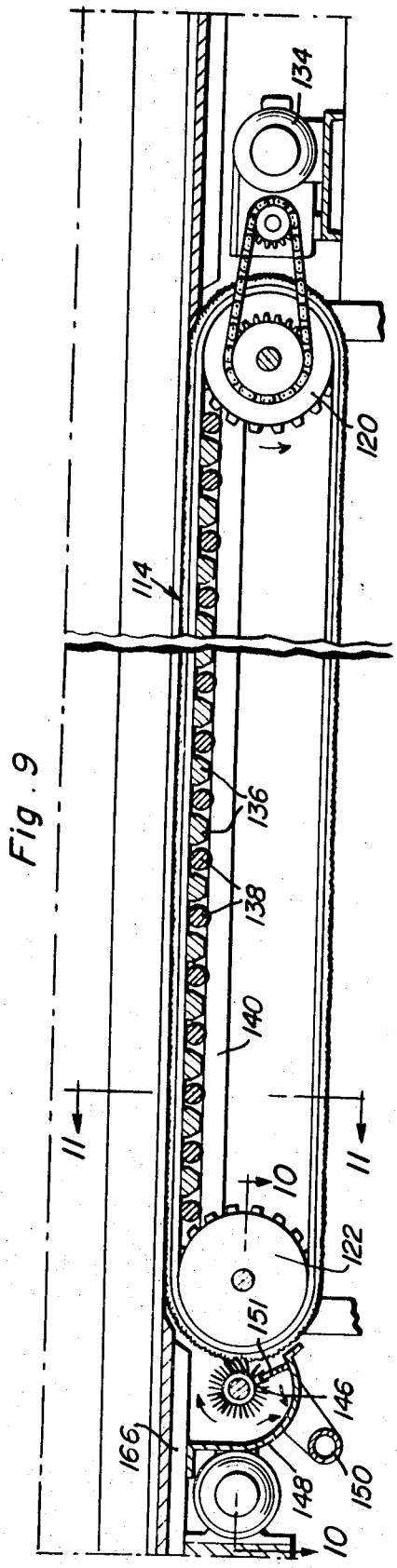
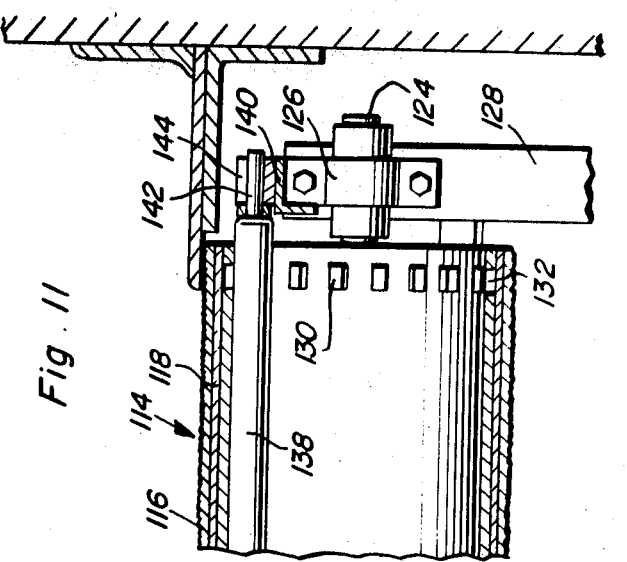
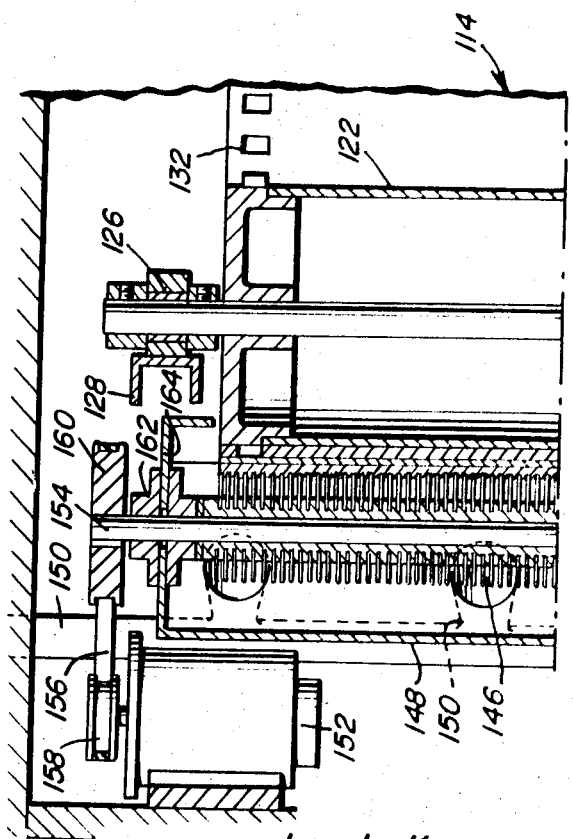
Lee L. Kayser
INVENTOR United States Patent Office 3,611,472
Patented Oct. 12, 1971

3,611,472
SELF-CLEANING FLOOR
Lee L. Kayser, 912 North St.,
White Plains, N.Y. 10605
Filed Feb. 4, 1969, Ser. No. 796,534
Int. Cl. A471 5/38
U.S. Cl. 15—302                                    13 Claims

ABSTRACT OF THE DISCLOSURE

An endless revolving floor in the nature of a continuous belt or belt-like unit mounted between opposed rollers with the upper run thereof constituting the floor or support surface, whether it be for an animal barn or an area in the home, for example the hallway or kitchen. A series of sprays and brushes underlie the revolving floor for cleaning engagement with the lower run of the floor forming belt-like unit during the travel thereof whereby an automatic cleaning of the floor can be effected. A drying blower is also provided. As an alternative form, particularly adapted for use in the home, a low profile dry cleaning unit, incorporating a vacuum system aind revolving brush, can be provided.

---

The instant invention relates to new and useful improvements in self-cleaning floors, and is more specifically directed to a revolving floor incorporating cleaning means subjacent thereto and operably engageable with the lower run of the endless belt-like unit which defines the floor.

In conjunction with the above object, it is a significant object of the instant invention to provide cleaning apparatus in the nature of a combination of sprays, cleaning brushes or beaters, waxing and/or disinfecting means, and drying means, whereby a complete cleaning and conditioning of the floor can be effected prior to the exposure as the support area in the particular room or area, normally a stable, animal barn or the like.

Another significant object of the instant invention resides in the provision of a variation of the instant invention particularly adapted for use in the home, such constituting a low profile unit wherein a dry cleaning process is utilized, reliance being had on the combined cleaning action of the beater type brush and a vacuum.

It is contemplated that the provision of a floor as set forth supra would eliminate the necessity of manually cleaning floors, and at the same time produce, in an automatic manner, a uniformly clean finished floor in a minimum amount of time, which in turn would make it more feasible to clean stable floors and the like at frequent intervals so as to maintain a cleaner environment for the animals.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 3 is an enlarged cross-sectional view taken substantially on a plane passing along line 3—3 in FIG. 2;

FIG. 4 is an enlarged transverse cross-sectional view taken substantially on a plane passing along line 4—4 in FIG. 2;

FIG. 5 is an enlarged cross-sectional detail taken substantially on a plane passing along line 5—5 in FIG. 2;

FIG. 6 is an enlarged cross-sectional detail taken substantially on a plane passing along line 6—6 in FIG. 2;

FIG. 7 is a top plan view of a portion of one of the closure plates overlying one end of the belt-like floor;

FIG. 8 is a partial perspective detail illustrating the floor supporting arrangement of rollers and guide track;

FIG. 9 is a longitudinal cross-sectional view through a modified form of self-cleaning floor;

FIG. 10 is an enlarged cross-sectional detail taken substantially on a plane passing along line 10—10 in FIG. 9; and FIG. 11 is an enlarged cross-sectional detail taken substantially on a plane passing along line 11—11 in FIG. 9.

Figure 1:
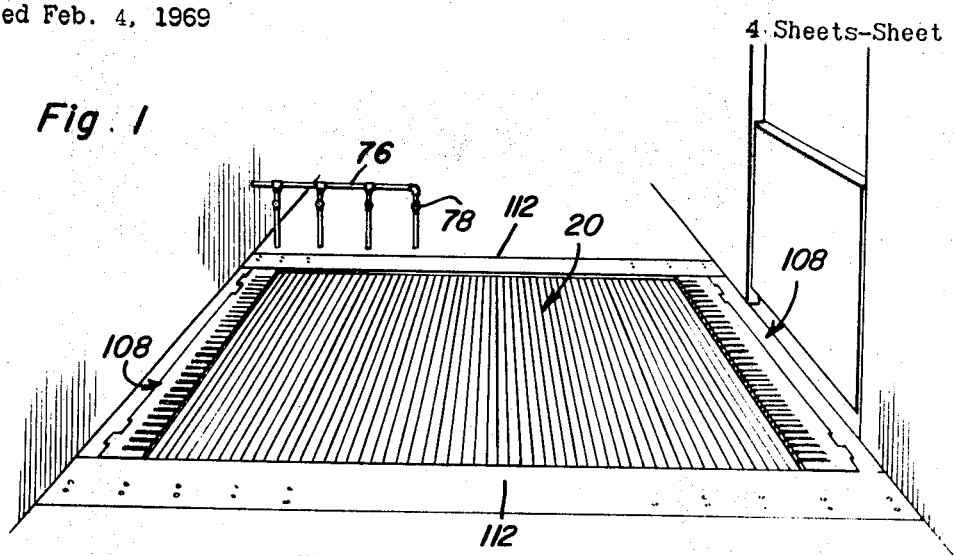
FIG. 1 is a perspective view of a barn or stable area with the self cleaning floor of the instant invention installed therein.

Referring now more specifically to the drawings, it will be appreciated that the floor, which is to be in effect self cleaning, actually constitutes the horizontally orientated upper run of a belt-like member or unit 20. The belt-type unit 20 is of course of a length and width sufficient so as to enable the horizontal upper run thereof to define the floor of the particular area involved, be it a stable, animal barn or the like.

The belt unit 20 is mounted and travels about a pair of parallel spaced drums 22 and 24, each fixed to an axially extending shaft 26 and 28, respectively, which shafts are in turn rotatably mounted within appropriate pillow blocks 30.

With reference to FIG. 3 and the lower run perspective detail of FIG. 8, it will be appreciated that the belt unit 20 is actually formed of a series of rigid planks 32, for example, oak planks, positioned in parallel adjacent relation to each other. Each of the planks 32 has a wheel mounting bracket 34 on each end thereof, the brackets 34 rotatably mounting grooved track receiving wheels 36. Finally, a wide flexible belt or belting 38 extends continuously about and is affixed to the inner faces of the planks 32 so as to tie the planks together while still enabling a relative movement therebetween such as will be required in travel about the end drums 22 and 24, and to likewise provide a support for the planks 32 along the lower run of the belt unit 20.

An endless track 40 is provided along each edge of the belt unit 20, each of these tracks 40 being in the nature of a T beam with the stem 42 thereof outwardly directed for reception within the grooved rollers 36 which travel thereabout. The two tracks 40 are supported by a plurality of support beams 44 which span the belt unit 20, extending transversely between the upper and lower runs thereof and laterally therebyond for seated support upon an appropriate support wall. The upper and lower runs of the two tracks 40 are affixed, as by bolting or welding, directly to the upper and lower flanges of the support beams 44 so as to be rigidly positioned thereby. With reference to FIG. 4 in particular, each of the tracks 40 extends continuously about the drum shafts 26 and 28 just outward from the corresponding drums so as to provide for a continuous tracking of the rollers 36 thereabout. As will be appreciated, the tracks 40, as they extend around the shafts 26 and 28, are of course spaced therefrom so as to not interfere with a rotation of the shafts effected during a traveling of the belt unit 20. The drums 22 and 24 themselves have the plank interlocking belting 38 engaged directly therewith with one of the drums 24 constituting a driven drum which, through an engagement with the belting 38, effects the desired power driving of the belt unit 20. This driving of the drum 24 will be effected from a motor unit 48 mounted below one end of the associated shaft 28 with an endless drive chain 50 extending from a drive sprocket on the motor drive shaft 52 to a sprocket 54 on the shaft 28.

Referring momentarily to FIG. 6, such illustrates the adjustable mounting of the shaft 26 associated with the drum 22 whereby a proper tension can be maintained in the belt unit 20 through a manipulation of the adjusting bolts 56.

Figure 2:
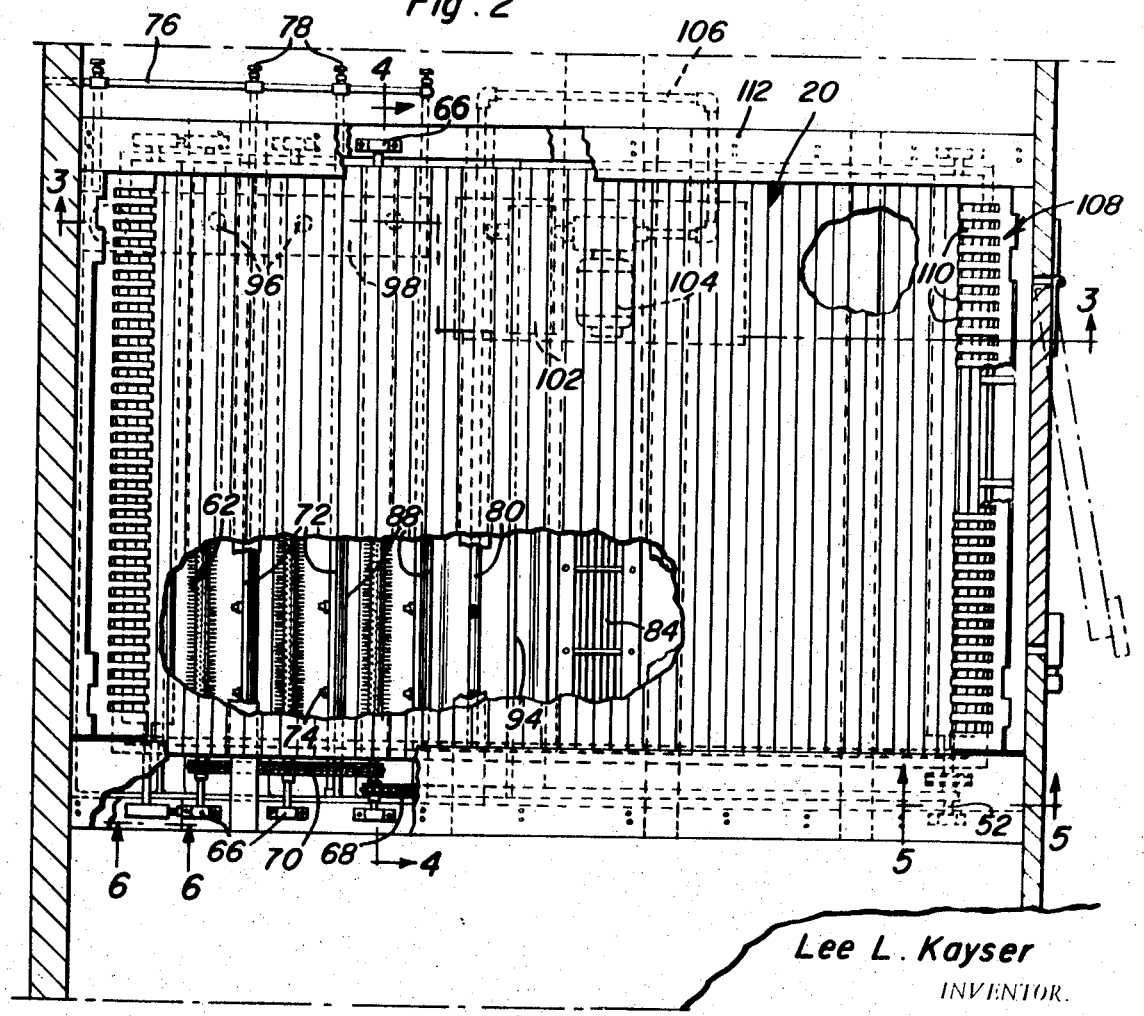
FIG. 2 is a top plan view, with portions broken away for purposes of illustration, of the floor of the instant invention.

Referring now particularly to FIGS. 2 and 3, it will be appreciated that the cleaning apparatus, located within an appropriate pit formed below the upper run of the belt unit 20, includes a pair of full width liquid handling pipes 58, each provided with a series of discharge nozzles 60 at spaced points therealong. These pipes 58 are provided immediately outward of the drum 22, the upper run of the belt unit 20 moving forwardly and downwardly over this drum 22 upon an activation thereof. The plurality of nozzles 60 are of course so directed as to discharge the fluid, be it plain water or a particular cleaning mixture, directly on the belt unit 20, and more particularly the exposed planks 32. As will be noted, the planks 32 open up or spread laterally as they pass over the drum, thus enabling an effective spray cleaning thereof.

Continuing along the lower run of the belt unit 20 in direction of travel thereof, three spaced parallel full width rotating brushes or brush-type beaters 62 are provided. Each of the brushes 62 has the axial shaft 64 thereof projecting longitudinally beyond the opposed ends thereof for rotatable reception within appropriate bearing blocks 66 mounted on appropriate supports or support walls to the opposite sides of the apparatus. The brushes 62 are of course so positioned as to engage and brush the lower run of the belt unit 20 as it moves thereby, these brushes 62 being driven in an opposite direction from that of the lower run of the belt unit 20 directly from the drive shaft 52 of the motor unit 48 by means of an appropriate endless drive chain 68 and a secondary drive chain 70, note FIG. 2 in particular. It is contemplated that the first brush encountered be relatively coarse, the second of a medium grade, and the third and final brush, of a fine grade. Further, a transverse liquid carrying pipe 72 parallels each brush 62 immediately beyond the brush 62 with each of these pipes 72 having a plurality of upwardly and rearwardly directed discharge nozzles 74 for a discharge of the cleaning liquid against the lower run of the belt unit 20 in the area of engagement of the corresponding brush 62 therewith so as to enhance the scrubbing or brushing action of the brush.

The two initial spray pipes 58, as well as the three brushes associated pipes 72 can be supplied with a cleaning fluid or detergent from any appropriate pressurized source, either through separate supply lines, or from a single main supply line 76 from which the flow of fluid can be controlled by a plurality of valves 78 leading to the individual pipes 58 and 72. Incidentally, while the supply line 76 and the valves 78 have been illustrated exposed above the floor position, it will be appreciated that such could, if so desired, be provided in a sunken well with a removable cover plate thereover.

A final liquid carrying pipe 80 is mounted transversely across the lower run of the belt unit 20 forward of the brushes 62 and associated pipes 72. This pipe 80 is specifically provided for spraying, through a series of upwardly directed discharge nozzles thereon, either wax or a disinfecting solution on the cleaned planks 32, and is in turn immediately followed by a transversely positioned upwardly discharging air duct 34 for a drying and final conditioning of the belt unit. Incidentally, the pressurized air directed through the air duct 84 can of course be preheated if so desired, an appropriate blower and heater being communicated with one end thereof.

In order to collect the discharge from the various pipes 58, 72 and 80, an enlarged collection tray 86, including upstanding peripheral walls, is provided below these pipes. The tray 86 is divided into a series of liquid receiving troughs by means of four upstanding full width walls 88 positioned so as to form separate troughs for each brush 62 and its associated spray pipe 72, as well as a first end trough for the initial spray pipes 58 and a final trough for the wax or disinfectant spray pipe 80. Each of the walls 88 is in turn provided with a flexible elastomeric wiper blade 90 along the upper edge thereof and in wiping engagement with the face of the belt unit 20 as it moves thereby. End walls 92 and 94 are also of course provided to complete the two end troughs, the wall 92, associated with the trough for the pipes 58, rising relatively high so as to deflect any backsplash from these pipes 58, while the wall 94, associated with the pipe 80 terminates short of the lower run of the belt unit 20 so as to allow this belt unit to move freely thereacross. Each of the troughs slope slightly to one side and include a discharge port 96 therein for a discharge of the collected fluid. The cleaning fluid, from the troughs associated with the pipes 58 and 72, collect in a drainage trough 98 which in turn discharges through an appropriate drain pipe 100. The disinfectant or wax solution, discharged from the pipe 80, is however returned to a reservoir or storage tank 102 from which the solution is to be recirculated by an appropriate motorized pump unit 104 to a return pipe 106 extending into a communication with one end of the pipe 80 as will be best appreciated from FIG. 2.

With reference to FIGS. 2 and 3 in particular, it will be noted that hingedly mounted flaps 108 are mounted on opposed pit walls so as to overlie the opposite ends of the upper run of the belt unit 20, these flaps 108 having a notched inwardly directed edge portion defining a series of spaced fingers 110 which, while allowing for a movement, especially at the end of the belt unit 20 moving about the drum 22, of the major portion of the debris therethrough, retains any large debris of a size such as might tend to clog the trough discharge ports. These panels 108 are upwardly pivotable so as to allow access to the apparatus therebelow.

With reference to FIGS. 2 and 4, it will be noted that removably bolted plates 112 are provided so as to overlie the opposed side edges of the belt unit 20, these plates 112 being removable so as to also allow access to the various operating components therebeneath.

While no detailed explanation regarding the configuration of the pit which receives the apparatus has been set forth herein, it will be appreciated that this pit is configured so as to closely receive the various components, with the side walls of the pit incorporating support ledges for the shaft receiving journal blocks.

In actual operation, when it becomes desirable to clean the floor, the various drive motors are actuated, preferably through remote switches, so as to advance the belt unit 20 and simultaneously introduce the various cleaning and finishing fluids along with a driving of the brushes. Once the belt unit 20 has been advanced sufficiently so as to move the entire used area thereof through the cleaning cycle, that is just past the drying duct 84, the apparatus can be shut off with the upper run of the belt unit 20 displaying a clean surface for use as a floor within the particular area involved.

Referring now specifically to FIGS. 9, 10 and 11, a modified form of self-cleaning floor has been illustrated therein. This form, while likewise usable in a stable or animal barn, is also particularly adapted for use in the home in that it incorporates what might be considered a low profile along with a dry cleaning process. The belt unit 114 is both endless and flexible, preferably consisting of a carpet-like outer layer 116 bonded to a strong flexible underlay 118. The belt unit 114 engages about a drive drum 120, at one end thereof, and an idler drum 120 at the other end thereof, both drums having the axial support shafts 124 thereof rotatably supported within appropriate pillow or journal blocks 126 affixed to upright supports 128. In order to positively engage the belt unit 114 with the drums 120 and 122, as well as to prevent any undesirable side slipping of the belt unit 114 on the drums, each drum is provided with a series of blunt outwardly projecting teeth 130 circumferentially about the opposed end portions thereof, while the belt underlay 118 is provided with a series of teeth receiving notches 132 therealong, providing in effect a sprocket type drive for the belt unit.

It is contemplated that the drive unit or motor 134 for the drive drum 120 be located on the same level therewith in order to reduce the height of the area required beneath the floor, thereby enabling, as one example, the accommodation of the unit in the crawl space provided beneath a home. In fact, if so desired unit 134 could be mounted between the upper and lower runs of the belt unit 114, rather than outward thereof as indicated in FIG. 9.

The upper run or floor defining portion of the belt unit 114 is supported from below by a series of rigid planks 136 provided with flat upper faces over which the belt unit 114 smoothly moves, and a series of rotatably mounted rollers 138 which alternate with the planks 136 so as to facilitate the movement of the belt unit 114 by reducing the frictional drag. It will of course be appreciated that the rollers 138 are of a size whereby the upper extent of each of the individual rollers 138 is coplanar with the flat upper surfaces of the adjacent planks 136 so as to provide in effect a continuous bearing surface for the upper run of the belt unit 114. The opposite ends of both the planks 136 and rollers 138 are supported on longitudinally extending beams 140 which are in turn fixed to suitable posts, for example the uprights 128 on which the drums 120 and 122 are mounted. Note in FIG. 11 in particular, each of the rollers 138 includes a shaft 142 projecting from the ends thereof and rotatably received within an appropriate bearing unit 144.

The actual cleaning in this embodiment is effected by an elongated beater type brush 146 orientated longitudinally along the drum 122 at approximately mid-height thereof and laterally outward therefrom, the belt unit 114, upon moving, being directed, at least insofar as the upper run is concerned, initially over the drum 122. The brush 146 is of course so located as to firmly engage against the belt unit 114 upon a power rotation of the brush 146 so as to effect a proper brushing of the dirt and the like therefrom. The brush 146 is enclosed within a shield or trough 148 which encircles the outer portion of the brush 146 and opens toward the drum mounted portion of the belt unit 114, terminating closely adjacent thereto whereby a relatively airtight closure is provided thereby. The chamber provided by the shield 148 is communicated, through appropriate ducts 150 extending therefrom at spaced points therealong, with a vacuum system whereby, upon an actuation of the vacuum system, a constant suction is provided within the brush chamber so as to effectively exhaust the dirt and the like brushed from the belt unit 114 by the rotating brush 146, this suction also tending to loosen and assist in the removal of the dirt from the belt unit 114 as it flexes about the drum 122. In addition, a comb-like unit 151 is mounted within and along the length of the shield 148 so as to engage the brush 146 and effect a continuous cleaning thereof by the removal of threads, hair, and other materials which do not freely drop or are drawn therefrom by the suction system. There is thus effected a combination beating, brushing and vacuuming of the carpet surface 116 of the belt unit 114 contemplated to thoroughly clean the carpet. Incidentally, it will be noted that the motor unit 152 which drives the brush 146 is mounted just forward of the brush covering shield 148 and drivingly engaged with the brush shaft 154 through a belt drive 156 engaged about a drive pulley 158 on the motor shaft and a driven pulley 160 affixed to the brush shaft 154. Further, it will be noted that FIG. 10 illustrates the bearing 162 for one end of the brush shaft as being mounted within an end wall 164 of the shield 148, the shield 148 in turn, noting FIG. 9, being affixed to an overhead support 166. However, if additional or alternate support means is desired for the brush shaft, suitable support posts, similar to the posts 128, can be provided. Such posts could also be utilized in providing a proper support for the brush enclosing shield 148.

The embodiment of FIGS. 9 through 11, because of the nature thereof, would find particular use within a home, possibly in an entrance hallway or in a kitchen, areas where, because of heavy traffic, tend to require more frequent cleaning, at least insofar as the floor is concerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Self-cleaning floor construction comprising an endless belt unit including a floor defining horizontal upper run, a pair of transversely elongated end drums about which said belt unit is engaged and between which said upper run extends, means for driving said belt unit about said drums with the upper run moving downwardly about one of said drums, power brush means extending transversely across said belt unit below the upper run thereof and in brushing engagement therewith transversely across the width of said belt unit whereby a brushing of the moving belt unit can be effected below the upper run thereof, dirt collecting means housing said brush means, a dirt discharge means communicating with said collecting means, pressurized liquid spray means associated with said brush means for directing a liquid spray of cleaning fluid or the like at the area of engagement between the brush means and the belt unit, an air duct positioned transversely across said belt unit below the upper run thereof and beyond the brush means and spray means along the path of travel of the belt unit, said air duct being so orientated so as to direct a discharge of air transversely across said belt unit, said brush means comprising a plurality of laterally spaced brushes, each extending transversely across said belt unit whereby a sequential brushing of said belt unit will be effected, said spray means comprising a plurality of liquid spray pipes, one positioned parallel to and adjacent each brush for the discharge of liquid at the area of engagement between the corresponding brush and the belt unit, said belt unit including a generally horizontal lower run, said brushes and associated spray pipes being positioned along the lower run of said belt unit and immediately therebelow, said dirt collecting means comprising a series of troughs, one associated with each brush and adjacent spray pipe.

2. The construction of claim 1 including flexible wiper means engaged with the lower run of said belt unit between each brush and spray pipe combination.

3. The construction of claim 2 including a final fluid pipe positioned between the last brush and associated spray pipe and the air duct, said final fluid pipe extending transversely across the lower run of the belt unit and communicating with a source of pressurized fluid.

4. The construction of claim 3 including a fluid recirculating system associated with said final fluid pipe, said final fluid pipe including a plurality of discharge points therealong upwardly directed toward the belt unit.

5. The construction of claim 4 including at least one fluid spray pipe extending transversely across said belt unit parallel to said one of said drums and outward thereof for directing an initial spray of fluid against said belt unit as it passes about said one of said drums.

6. Self-cleaning floor construction comprising an endless belt unit including a floor defining horizontal upper run, a pair of transversely elongated end drums about which said belt unit is engaged and between which said upper run extends, means for driving said belt unit about said drums with the upper run moving downwardly about one of said drums, power brush means extending transversely across said belt unit below the upper run thereof and in brushing engagement therewith transversely across the width of said belt unit whereby a brushing of the moving belt unit can be effected below the upper run thereof, dirt collecting means housing said brush means, a dirt discharge means communicating with said collecting means, pressurized liquid spray means associated with said brush means for directing a liquid spray of cleaning fluid or the like at the area of engagement between the brush means and the belt unit, said brush means comprising a plurality of laterally spaced brushes, each extending transversely across said belt unit whereby a sequential brushing of said belt unit will be effected, said spray means comprising a plurality of liquid pipes, one positioned parallel to and adjacent each brush for the discharge of liquid at the area of engagement between the corresponding brush and the belt unit.

7. The construction of claim 6 including an additional fluid spray discharging pipe positioned beyond the last of said brush and spray pipes and extending transversely across the lower run of said belt unit for a pressure discharge of fluid thereagainst, and a fluid recirculating system associated with said additional fluid spray pipe for receiving and recirculating the pressure discharged fluid.

8. The construction of claim 6 wherein said dirt collecting means comprises a series of troughs, one associated with each brush and adjacent spray pipe.

9. The construction of claim 8 including flexible wiper means engaged with said belt unit between each brush and spray combination.

10. The construction of claim 8 including a final fluid pipe positioned between the last brush and associated spray pipe, said final fluid pipe extending transversely across the belt unit and communicating with a source of pressurized fluid for a pressure discharge of fluid on said belt unit, and a fluid recirculating system associated with said final fluid pipe for a recirculation of the discharged fluid.

11. The construction of claim 6 wherein said belt unit includes a plurality of adjacent transversely extending planks, each plank including an inwardly extending roller rotatably mounted on each end thereof, and a pair of endless tracks, on along each edge of said belt unit, said tracks receiving and guiding said plank rollers for travel therealong.

12. The construction of claim 6 including flexible wiper means engaged with said belt unit between each brush and spray pipe combination.

13. Self-cleaning floor construction comprising an endless belt unit including a floor defining horizontal upper run, a pair of end drums about which said belt unit is engaged and between which said upper run extends, means for driving said belt unit about said drums with the upper run moving downwardly about one of said drums and along a generally horizontal lower run to the second of said drums, a series of liquid spray pipes mounted beneath said lower run at spaced points therealong, each of said spray pipes extending transversely across the lower run of the belt unit and including upwardly directed discharge means at spaced points therealong, a pressurized fluid source communicating with said spray pipes for the introduction of a pressurized fluid thereto, and an air duct paralleling said spray pipes beyond the last one thereof along the path of travel of the lower run of said belt unit, a source of pressurized air communicating with said air duct, said air duct including upwardly directed discharge means thereon for effecting a discharge of pressurized air against said belt unit beyond said spray pipes, said belt unit including a plurality of adjacent transversely extending planks, each plank including an inwardly extending roller rotatably mounted on each end thereof, and a pair of endless tracks, one along each edge of said belt unit, said tracks receiving and guiding said plank rollers for travel therealong.

References Cited

UNITED STATES PATENTS

| | | | |
|---|---|---|---|
| 1,019,769 | 3/1912 | Dalton | 15—36 |
| 1,567,832 | 12/1925 | Broge | 15—36 |
| 1,908,788 | 5/1933 | Pulliam | 15—51 X |
| 2,482,882 | 9/1949 | Swanson | 15—36 X |
| 2,533,781 | 12/1950 | Fallowfield, Jr. | 15—36 |
| 1,757,461 | 5/1930 | Losey | 15—48 X |
| 2,430,720 | 11/1947 | Kline et al. | 198—195 X |
| 3,274,973 | 9/1966 | Woods et al. | 119—28 X |

FOREIGN PATENTS

| | | | |
|---|---|---|---|
| 1,033,864 | 6/1966 | Great Britain | 15—36 |
| 893,182 | 4/1962 | Great Britain | 15—36 |

ROBERT W. JENKINS, Primary Examiner

C. K. MOORE, Assistant Examiner

U.S. Cl. X.R.

15—306 A